(12) United States Patent
Shin (10) Patent No.: US 9,742,797 B2
(45) Date of Patent: Aug. 22, 2017

(54) METHOD FOR INCORPORATING NETWORK PORT HOPPING WITH MINIMAL OR NO IMPACT TO UNDERLYING SYSTEMS

(71) Applicant: Raytheon Company, Waltham, MA (US)

(72) Inventor: David W. Shin, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 678 days.

(21) Appl. No.: 14/253,131

(22) Filed: Apr. 15, 2014

(65) Prior Publication Data

US 2015/0296052 A1   Oct. 15, 2015

(51) Int. Cl.
*G06F 15/16*   (2006.01)
*H04L 29/06*   (2006.01)

(52) U.S. Cl.
CPC ...... *H04L 63/1458* (2013.01); *H04L 63/1441* (2013.01)

(58) Field of Classification Search
CPC . H04L 45/14; H04L 63/1458; H04L 63/1441; H04B 1/00; H04B 1/715; H04B 1/7136; G06F 9/45558; G05F 2009/45595
USPC .......... 709/203, 227, 228, 245, 250
See application file for complete search history.

(56) References Cited

U.S. PATENT DOCUMENTS

| 2005/0220017 | A1 | 10/2005 | Brand et al. |
| 2008/0313348 | A1* | 12/2008 | Morris ........... H04L 9/0841 709/239 |
| 2015/0236752 | A1* | 8/2015 | Cruz ............... H04K 1/003 375/135 |

OTHER PUBLICATIONS

"Technique and Application of End-hopping in Network Defense", Tianjin, China, 2010, pp. 266-270.*
Lee, Henry C.J., "Port Hopping for Resilient Networks", IEEE, (2004), 5 pgs.
Shi, Leyi, et al., "Port and Address Hopping for Active Cyber-Defense", Springer-Verlag Berlin Heidelberg, (2007), 295-300.

* cited by examiner

*Primary Examiner* — Ario Etienne
*Assistant Examiner* — Sahera Halim
(74) *Attorney, Agent, or Firm* — Schwegman Lundberg & Woessner, P.A.

(57) ABSTRACT

Embodiments for providing port hopping are generally described herein. In some embodiments, a client system is disposed at a client node. A host system is disposed at a host node, wherein the host system includes a first port designated for receipt of packets from the client system. A port hopping interface is disposed between the client system and the host system, wherein the port hopping interface receives data from the client system and relays the received data to the first port of the host system based on a port hopping technique.

11 Claims, 8 Drawing Sheets

METHOD FOR INCORPORATING NETWORK PORT HOPPING WITH MINIMAL OR NO IMPACT TO UNDERLYING SYSTEMS

BACKGROUND

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Networks are vulnerable to attacks and eavesdropping on ports open for active channels. As used herein, "port" refers to a number field in a network protocol that is used for de-multiplexing at a particular layer. Examples of ports include the user datagram protocol (UDP) port field, the transmission control protocol (TCP) port field and Stream Control Transmission Protocol (SCTP) port field. In particular, since these ports are "open," packets arriving on them are accepted, at least initially, even if they are not actually part of an authorized media stream.

A communication system may employ a hopping scheme to improve interference and security. Port hopping is a technique where network data is sent and received via dynamically changing ports in a defense mainly against eavesdropping and denial of service (DoS) attacks. Existing techniques for providing port hopping have been proposed. However, existing techniques adhere to a given protocol. Furthermore, these protocols and algorithms are cumbersome and sometimes not feasible to implement because most modern applications predominantly rely on a set of third party tools and external systems. The underlying code implementation, especially for the host system, would involve modifications which are not feasible, and may be impossible, i.e., it would entail complete control over the systems.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments and equivalents described herein provide for implementation of port hopping strategies in a noninvasive manner to allow existing applications, systems, or frameworks to be used with minor or no underlying changes.

Figure 1:
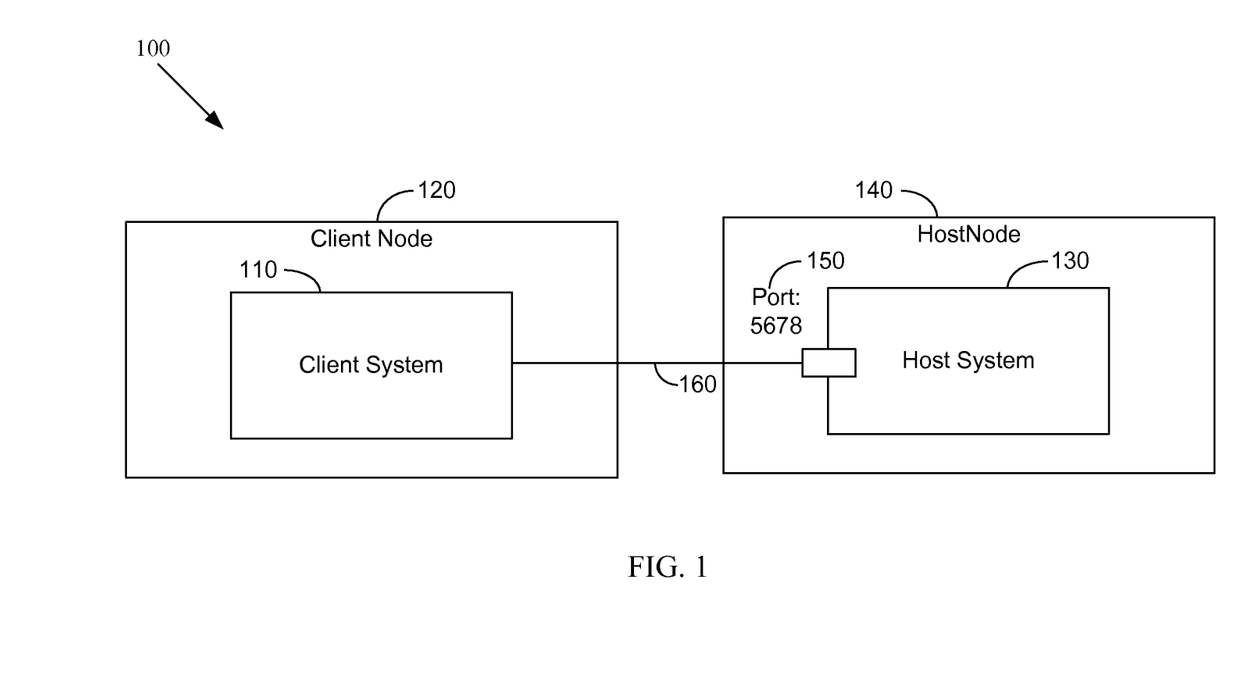
FIG. 1 illustrates a logical representation of a scenario where port hopping may be applied.

FIG. 1 illustrates a logical representation of a scenario where port hopping may be applied 100. In FIG. 1, a client system 110 at a client node 120 is connecting to a host system 130 at a host node 140 using the host node address and a revealed port (5678) 150. The data channel 160 between client system 110 and host system 130 is bi-directional. A client system 110 is a type of resource that engages in a communication session with one or more other resources for purposes of gaining access to those resources, such as acquiring access to content. A resource may include a user, content, a processing device, a client, a server, a proxy, a node, a service, an application, a system, a principal, a directory, a data store, groups of users, combinations of these things, etc. Resources may be within a local environment of the client system 110, e.g., within the client node 120, or may be within an external environment remote from the local environment of the client, e.g., the host node 140. A server is another type of resource that engages in communication sessions with clients or other servers or resources, e.g., host system 130. Client system 110 may be connected to a server, e.g., host system 130, via a network configuration, such as a local area network (LAN), a Wide Area Network (WAN, such as the Internet), etc.

Network protocols may be used that rely on port numbers to map to resources. Such protocols include Transmission Control Protocol (TCP) and User Datagram Protocol (UDP). These protocols are central to processing associated with traditional Internet traffic. In the Transmission Control Protocol/Internet Protocol TCP/IP protocol suite, Internet applications use the socket interface to establish a communication channel for exchanging data. Well-known ports (0 through 1023) are used by servers to provide services. However, the well-known port design is vulnerable to port scanning and eavesdropping because of the fixed service port. A communication port, e.g., port 5678 150, refers to a logical network destination associated with an application on a machine, and many ports can exist on one physical network destination. Each port, e.g., port 5678 150, may be reserved or designated for different types of network traffic. Generally, port numbers appear in network packets and these port numbers map to specific processes or resources on the receiving machine that can handle or that are expecting those network packets. A network packet's header may include both a source (originating or sender) port number and a destination (receiver or recipient) port number, e.g., port 5678 150. Some resources are preconfigured to listen on certain predefined port numbers and ignore traffic associated with other port numbers.

In communication systems, frequency hopping is an efficient tactic which can keep the enemies in the dark by changing the radio frequency pseudo-randomly. Inspired by frequency hopping, a port and address hopping paradigm may be used to puzzle the adversaries by hopping the port and address information pseudo-randomly during data transmission. More specifically, port and address hopping is a dynamic tactic that is used to vary the User Datagram Protocol/Transmission Control Protocol (UDP/TCP) port number used by the server as a function of time or according to a predetermined sequence and such changes is known to the server and the client.

Adding port hopping behavior involves code changes in both the client system 110 and host system 130. However, in most cases, the client system 110 is a user to the host system 130 and will not be given the permission to make changes to implement port hopping protocols on the host system 130. To minimize the risk, a port hopping technique according to an embodiment is used that minimizes intrusiveness and leave the existing interface and protocols in place. Accordingly, embodiments described herein provide an architectural/infrastructure for port hopping functionality with no or minimal impact to the underlying infrastructure and systems. A new protocol for port hopping is therefore unnecessary because the underlying system is left intact while still providing port hopping behavior between the client and the host.

Figure 2:
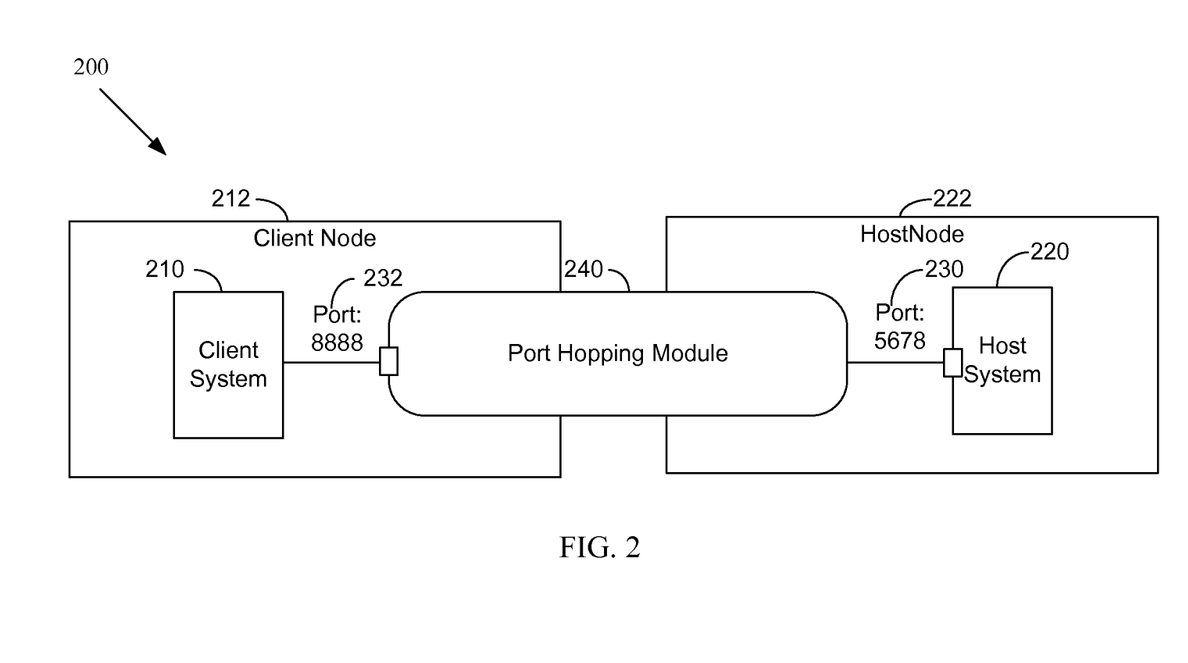
FIG. 2 illustrates a port hopping framework according to an embodiment.

FIG. 2 illustrates a port hopping framework 200 according to an embodiment. In FIG. 2, a client system 210 at a client node 212 is connecting to a host system 220 at a host node 222. However, a port hopping module 240 is used to interface between the client system 210 and the host system 220.

As the hopper module 240 is introduced, the service ports of the host system 220 do not change, i.e., the host system is still providing the service via port 5678 230. The change is to the client system 210 is where the destination port has changed from 5678 to 8888 232. Most systems may have these parameters externally configurable leaving the system intact.

Figure 3:
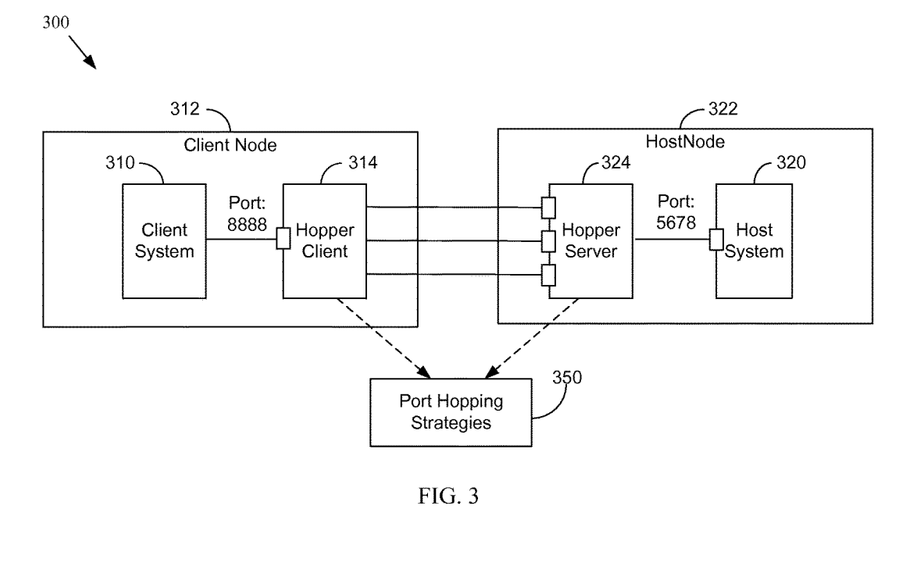
FIG. 3 illustrates a block diagram of a system using port hopping according to an embodiment.

FIG. 3 illustrates a block diagram of a system 300 using port hopping according to an embodiment. In FIG. 3, a client system 310 at a client node 312 is connecting to a host system 320 at a host node 322. The client node 312 has its own Internet Protocol (IP) address and the host node 322 also has its own IP address. The client system 310, e.g., the user, connects to the host system 320. The host system 320 provides the service to the connecting client system 310. A hopper client 314 is provided to receive data from the client system 310, apply port hopping techniques, and then sending the client data to the hopper server 324. The hopper server 324 resides on the host node 322 and is responsible for putting the data back into the original form sent by the client system 310 and for relaying the data in original form to the host system 320.

Hopping strategies 350 may be provided for use by the hopper client 314 and the hopper server 324. The hopping strategies 350 may be statically loaded or dynamically configured during initial handshake between the hopper client 314 and hopper server 324.

Figure 4:
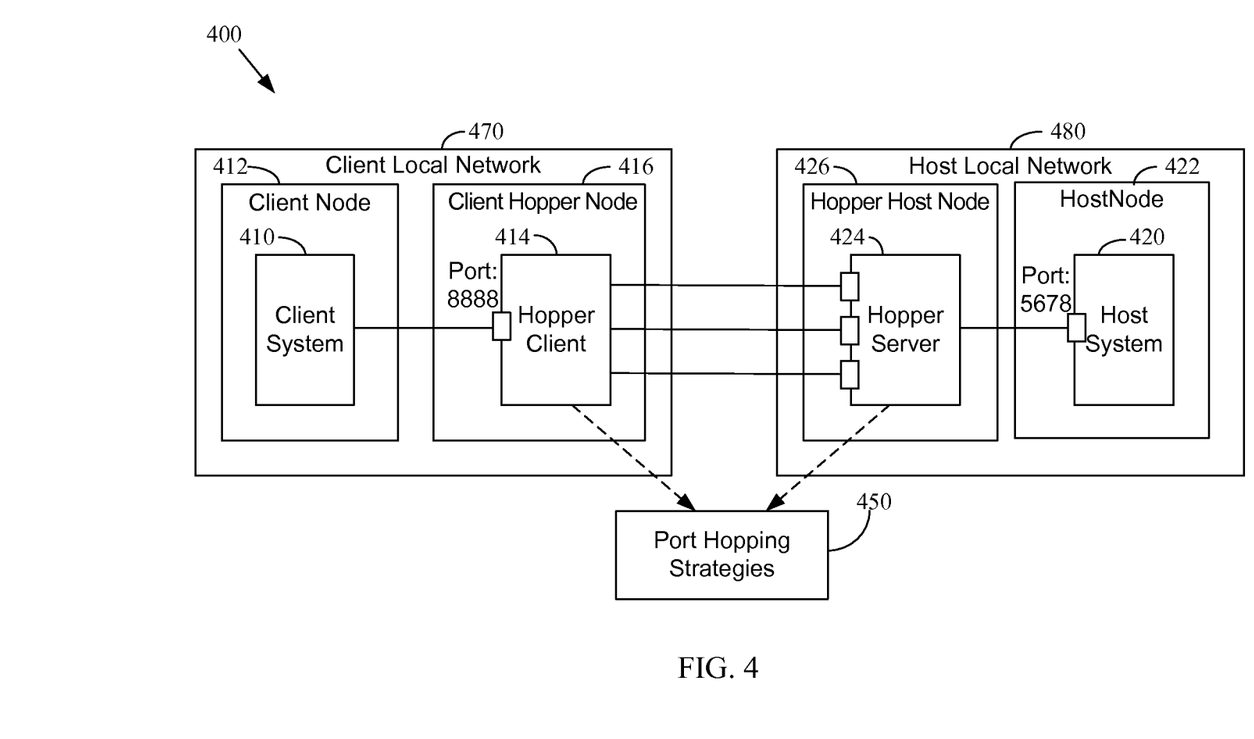
FIG. 4 illustrates the use of hopping modules on separate host and client nodes according to an embodiment.

FIG. 4 illustrates the use of hopping modules 400 on separate host and client nodes according to an embodiment. In FIG. 4, a client system 410 at a client node 412 is connecting to a host system 420 at a host node 422. The client node 412 is disposed in a client local network 470. The host node 422 is disposed in a host local network 480. Since there are a finite number of ports available in a node, careful consideration is given when allocating ports for each node. Port conflict occurs when a port is attempted to be used by more than one process. A strategy may be provided to dynamically change the socket bindings to change ports. However, as mentioned above, making changes to the protocol is undesirable. For example, dynamically changing ports may be hard to achieve for a node where other network enabled processes are running. An alternate solution is to place the hopper client 414 in a client hopper node 416, which is also part of the client local network 470 and the hopper server 424 is placed in a hopper host node 426 to free up a set of ports available to the hopper modules. Hopping strategies 450 may be provided for use by the hopper client 414 and the hopper server 424.

Figure 5:
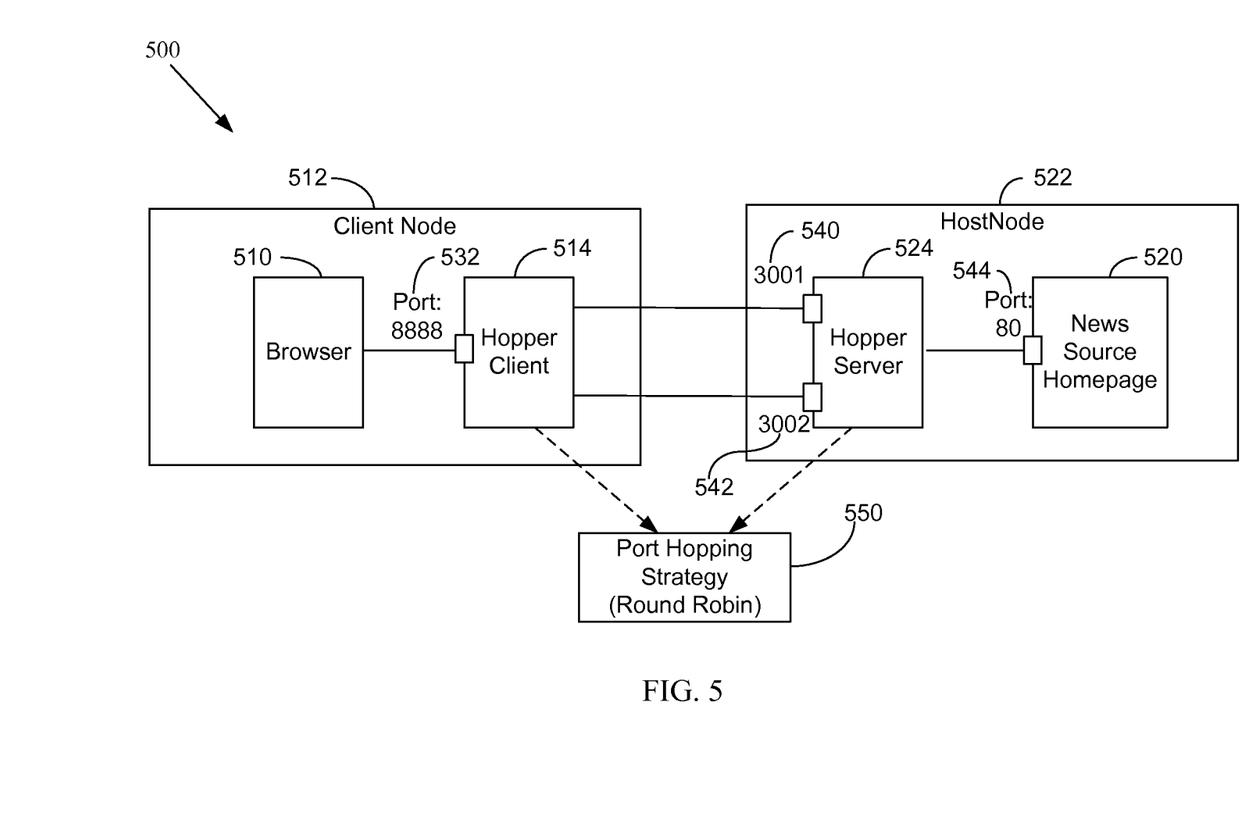
FIG. 5 illustrates the operation of the port hopping technique according to an embodiment.

FIG. 5 illustrates the operation of the port hopping technique 500 according to an embodiment. In FIG. 5, the client system is a browser 510 and a news source's homepage 520 is the hosting system. The browser 510, which is disposed at a client node 512, is connecting to a host system 520 at a host node 522. Once the hopper server 524 and hopper client 514 are up and running, the browser 510 is used as the client system. The address of "port 8888" 532, e.g., "http://localhost:8888, is used by the browser 510. This allows the browser to use the appropriate hypertext transfer protocol (HTTP). In one embodiment, a port hopping strategy 550 may include a user defined strategy, such as a round robin port hopping technique using a two port strategy. The hopper server 524 thus alternates between port 3001 540 and 3002 542. However, those skilled in the art will recognize that the use of a round robin strategy is provided merely an one example and other port hopping strategies may be implemented. The news source homepage 520 uses port 80 544.

Figure 6:
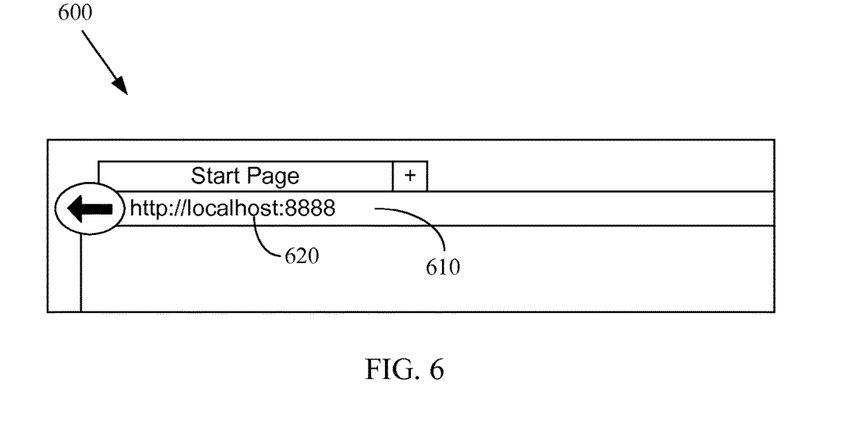
FIG. 6 shows a portion of a browser user interface according to an embodiment.

FIG. 6 shows a portion of a browser user interface 600 according to an embodiment. In FIG. 6, the address field 610 shows the address 620 of "http://localhost:8888."

Figure 7:
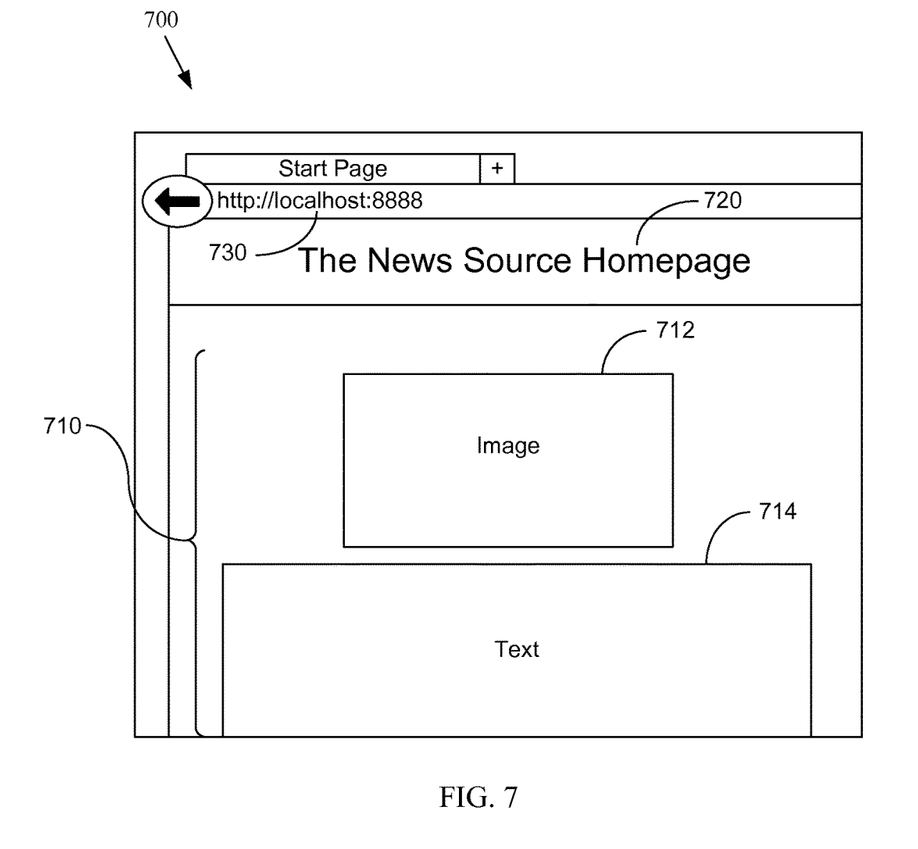
FIG. 7 illustrates a browser according to an embodiment.

FIG. 7 illustrates a browser 700 according to an embodiment. In FIG. 7, the browser 700 has obtained content 710, e.g., images 712 and text 714, from the news source homepage 720. The content 710 is shown as being associated with the address 730 of "http://localhost:8888."

Figure 8:
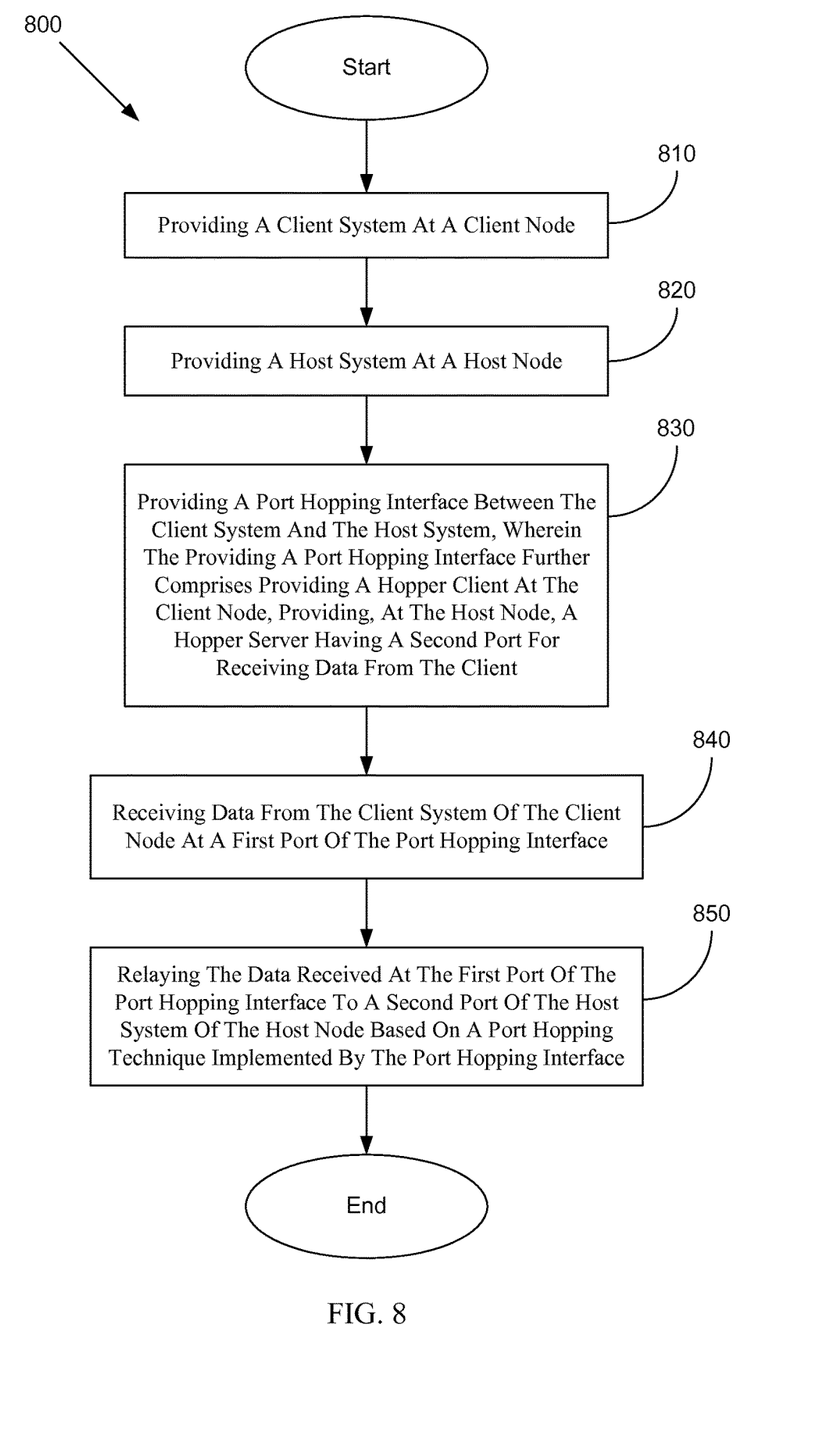
FIG. 8 is a flowchart of a method for providing port hopping according to an embodiment.

FIG. 8 is a flowchart 800 of a method for providing port hopping according to an embodiment. A client system is provided at a client node 810. A host system is provided at a host node 820. A port hopping interface is provided between the client system and the host system 830. For example, a port hopping interface may further comprise providing a hopper client at the client node, providing, at the host node, a hopper server having a second port for receiving data from the client. Data from the client system of the client node is received at a first port of the port hopping interface 840. The data received at the first port of the port hopping interface is relayed to a second port of the host system of the host node based on a port hopping technique implemented by the port hopping interface 850.

Figure 9:
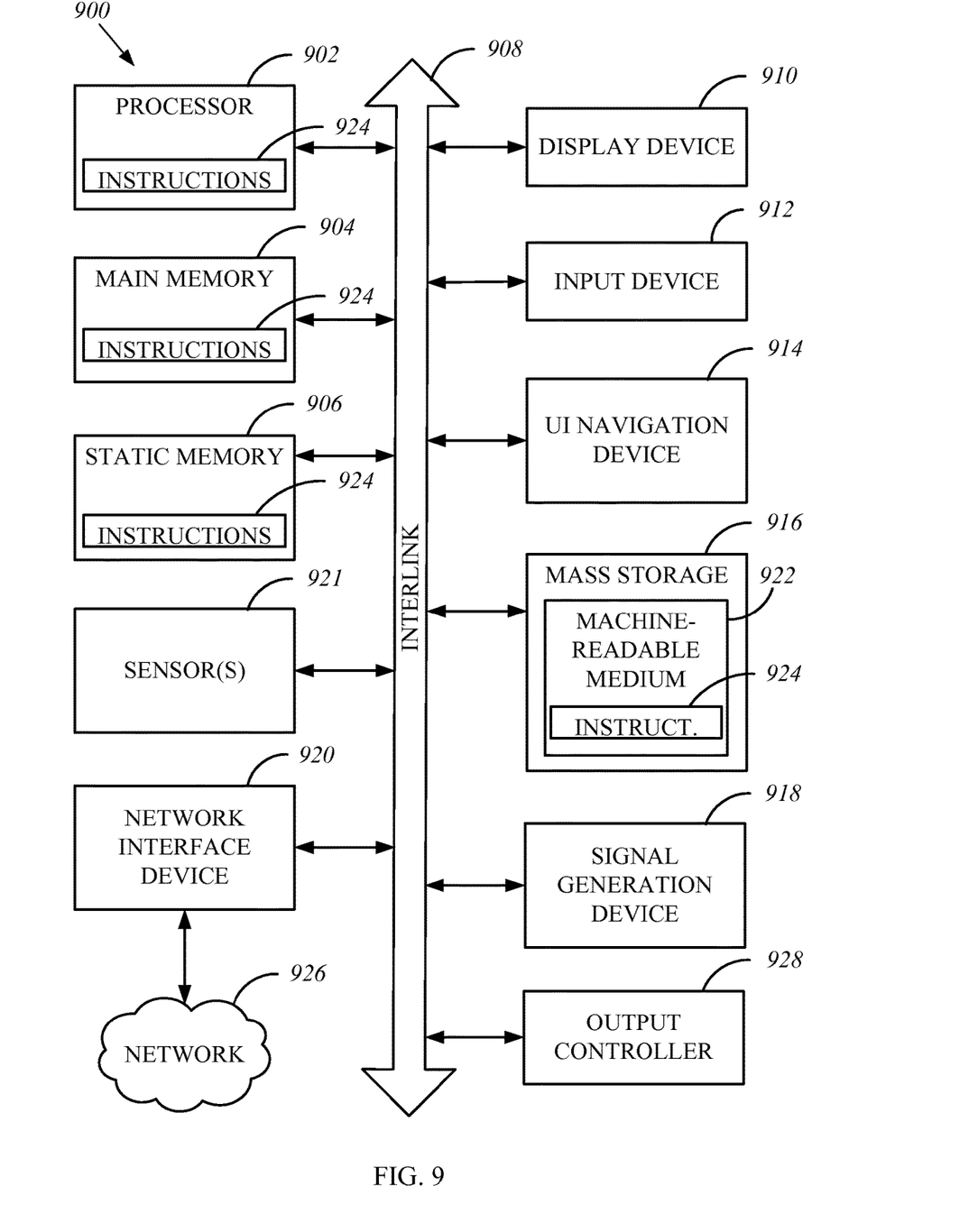
FIG. 9 illustrates a block diagram of an example machine for incorporating network port hopping with minimal or no impact to underlying systems according to an embodiment

FIG. 9 illustrates a block diagram of an example machine 900 for incorporating network port hopping with minimal or no impact to underlying systems according to an embodiment upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine and/or a client machine in server-client network environments. In an example, the machine 900 may act as a peer machine in peer-to-peer (P2P) (or other distributed) network environment. The machine 900 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 902 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 902 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 900 may include a hardware processor 902 (e.g., a central processing unit (CPU), a graphics processing unit (GPU), a hardware processor core, or any combination thereof), a main memory 904 and a static memory 906, at least some of which may communicate with others via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR)) connection to communicate or control one or more peripheral devices (e.g., a printer, card reader, etc.).

The storage device 916 may include at least one machine readable medium 922 on which is stored one or more sets of data structures or instructions 924 (e.g., software) embodying or utilized by any one or more of the techniques or functions described herein. The instructions 924 may also reside, at least partially, additional machine readable memories such as main memory 904, static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) that configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact-disk read-only memory (CD-ROM) and digital video disk read-only memory (DVD-ROM) disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A port hopping system, comprising:
    a client system coupled to a hopper client at a client node having a first Internet Protocol (IP) address, the hopper client configured to receive client data from the client system at a destination port, apply hopping strategies to produce packetized data, and transmit the packetized data;
    a host system coupled to a hopper server at a host node having a second IP address that is different from the first IP address, the hopper server configured to receive the packetized data, convert the packetized data to the client data based on the hopping strategies, and transmit the client data to the host system; and
    a port hopping strategies device coupled to the hopper client and the hopper server, wherein the port hopping strategies device is configured to provide a port hopping technique for the hopper client and the hopper server during an initial handshake between the hopper client and the hopper server;
    wherein the hopper client and the hopper server are configured to provide port hopping behavior without changing an underlying infrastructure of the host system by changing the destination port of the hopper client while the host system port of the host system remains unchanged.

2. The port hopping system of claim 1 further comprising a hopping strategies device arranged to provide hopping techniques to the port hopping interface.

3. The port hopping system of claim 1, wherein the port hopping interface provides a bi-directional data channel between the client system and the host system.

4. The port hopping system of claim 1, wherein the hopper client and the hopper server dynamically change socket bindings to change ports between the hopper client and the hopper server.

5. The port hopping system of claim 1, wherein the hopper client is disposed in the client node in a client local network with the client node and wherein the hopper server is disposed in the host node in a host local network with the host node, the disposing of the hopper client in the client node in the client local network with the client node and the disposing of the hopper server in the host node in the host local network with the host node frees a set of ports for use by another hopper client and hopper server.

6. The port hopping system of claim 1, wherein the hopping techniques are statically loaded in the hopping strategies device.

7. The port hopping system of claim 1, wherein the hopping techniques are dynamically configured during the initial handshake between the hopper client and the hopper server.

8. The port hopping system of claim 1, wherein the hopping techniques include a user defined port hopping technique, wherein the hopper client and the hopper server alternate between a third port and a fourth port therebetween.

9. A method for providing network port hopping, comprising:
    providing a port hopping interface between a client system and a host system, the port hopping interface comprising a hopper client coupled to the client system in a client node having a first Internet Protocol (IP) address and a hopper server coupled to the host system in a server node having a second IP address that is different from the first IP address;

providing hopping strategies to the hopper client and the hopper server, during an initial handshake between the hopper client and the hopper server, from a port hopping strategy device coupled to the hopper client and the hopper server;

applying the hopping strategies to produce packetized data, comprising port numbers, from client data, and transmit the packetized data;

converting, by the hopper server, the packetized data with the port numbers back to client data for use by the host system;

converting the packetized data back to the client data at the hopper server; and relaying the client data, received at a destination port of the hopper server, to a host system port of the host system based on a port hopping strategy received from the port hopping strategy device during the initial handshake.

10. The method of claim 9, wherein providing the port hopping interface between the client system and the host system further comprises providing the client system in the client node in a client local network, providing the host system in the host node in a host local network and providing the hopper client in a client hopper node as part of the client local network with the client node and providing the hopper server in the hopper host node as part of the host local network with the host node.

11. The method of claim 9, wherein the providing the hopping strategies device further comprises providing a user defined port hopping technique, wherein the hopper client and the hopper server alternate between a third port and a fourth port therebetween.

* * * * *

UNITED STATES PATENT AND TRADEMARK OFFICE
CERTIFICATE OF CORRECTION

PATENT NO. : 9,742,797 B2  
APPLICATION NO. : 14/253131  
DATED : August 22, 2017  
INVENTOR(S) : David W. Shin Page 1 of 1

It is certified that error appears in the above-identified patent and that said Letters Patent is hereby corrected as shown below:

In the Drawings

On sheet 1 of 8, Fig. 1, reference numeral 140, delete "HostNode" and insert --Host Node-- therefor On sheet 2 of 8, Fig. 2, reference numeral 222, delete "HostNode" and insert --Host Node-- therefor On sheet 3 of 8, Fig. 3, reference numeral 322, delete "HostNode" and insert --Host Node-- therefor

On sheet 4 of 8, Fig. 4, reference numeral 422, delete "HostNode" and insert --Host Node-- therefor On sheet 5 of 8, Fig. 5, reference numeral 522, delete "HostNode" and insert --Host Node-- therefor In the Specification In Column 1, Line 67, after "embodiment", insert --.--

Signed and Sealed this  
Fifth Day of May, 2020

Andrei Iancu  
*Director of the United States Patent and Trademark Office*